UNITED STATES PATENT OFFICE.

MARION F. DERBY, OF JERSEY CITY, NEW JERSEY.

PROCESS FOR PRESERVING FRUITS AND OTHER ARTICLES.

SPECIFICATION forming part of Letters Patent No. 233,217, dated October 12, 1880.

Application filed January 14, 1880. (No specimens.)

*To all whom it may concern:*

Be it known that I, MARION F. DERBY, a citizen of the United States, residing in Jersey City, in the county of Hudson and State of New Jersey, have invented a new and useful Process of Preserving Fruits, Vegetables, and other Perishable Articles, of which the following is a specification.

This invention relates to an improved process for preserving fruit, vegetables, and other perishable articles; and it has for its object to preserve such articles, without cooking, in a natural juicy state.

To this end the invention consists in subjecting fruit or articles of food to the action of sulphurous-acid gas until thoroughly permeated by the same, and then placing the fruit or articles in ordinary fruit-jars, cans, or other vessels, upon which is poured water holding alum and sulphurous acid in solution, as more fully hereinafter specified.

In carrying out my invention the fruit, vegetables, or other article of food to be preserved is placed in a closed chamber, such as a refrigerator, although an ordinary box would answer, and in said chamber is also placed an ordinary pail or other receptacle capable of holding water. The said pail or receptacle is then supplied with a requisite quantity of water containing alum in solution. The proportions of alum and water may be somewhat varied; but for general purposes fifteen grains of pulverized alum to one gallon of water will be found to accomplish the desired result. After this a dish or other receptacle containing about one ounce of sulphur is placed in the chamber or box, and upon the sulphur live coals are placed so as to ignite the sulphur, after which the lid of the chamber or box is closed, and the articles to be preserved left exposed to the sulphurous-acid gas generated by the burning sulphur for about four hours. After the articles have thus become thoroughly permeated by the gas they are removed from the box or chamber and placed in ordinary preserving-jars, bottles, cans, or other vessels, and the solution of alum, which will have absorbed sulphurous-acid gas during the process of treating the articles, is poured into said vessels so as to cover the articles, when the vessels are simply covered to exclude dust, dirt, &c., hermetical sealing being unnecessary, although said vessels may be hermetically sealed if desired.

I am aware that articles to be preserved have heretofore been exposed to the fumes of a burning compound of sulphur, charcoal, and alum, and then dried; but by the use of such compound the articles are only subjected to the action of a mixture of antiseptic gases, and not to the direct action of the antiseptic properties of a compound solution of sulphurous-acid gas and alum, as in the present case.

The advantage of my improvement will be apparent from the fact that by my invention the fruit or other articles are preserved in a juicy and nearly natural state, instead of being deprived of their juices, as in the case of drying.

Having described my invention, what I claim, and desire to secure by Letters Patent, is—

The process herein described of preserving fruit and other articles, the same consisting in simultaneously subjecting the articles and a solution of alum in a closed vessel to the action of sulphurous-acid gas, whereby a portion of the gas is absorbed by the articles and the alum solution, the alum solution with the absorbed gas serving subsequently as a preservative agent to be poured over the articles which are placed in suitable vessels, substantially as specified.

MARION F. DERBY.

Witnesses:
W. H. LEWIS,
A. H. HAYES.